July 22, 1969        H. J. STINGER        3,456,495
METHOD AND APPARATUS FOR MEASURING DYNAMIC FRICTIONAL
PROPERTIES OF ELASTOMERS
Filed Jan. 26, 1967
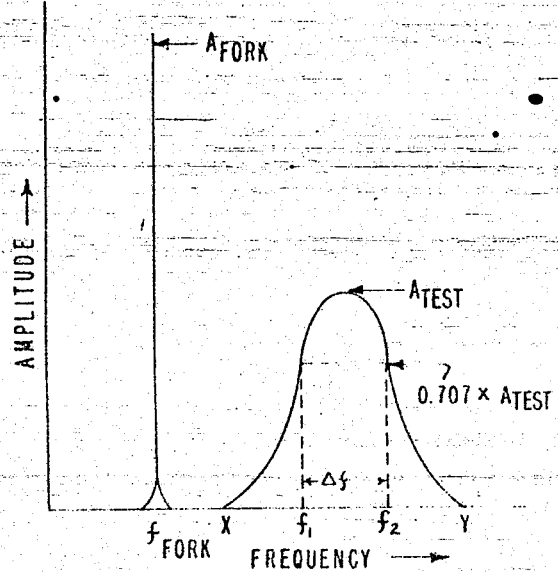
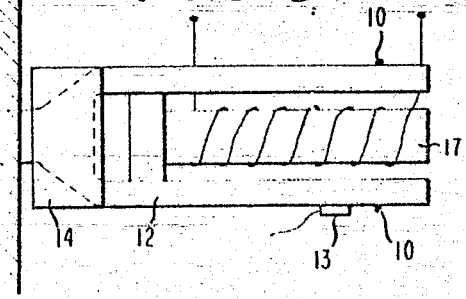
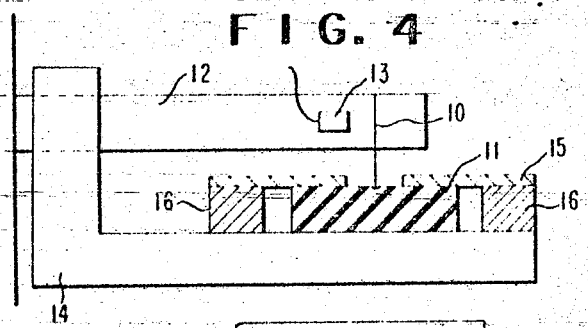
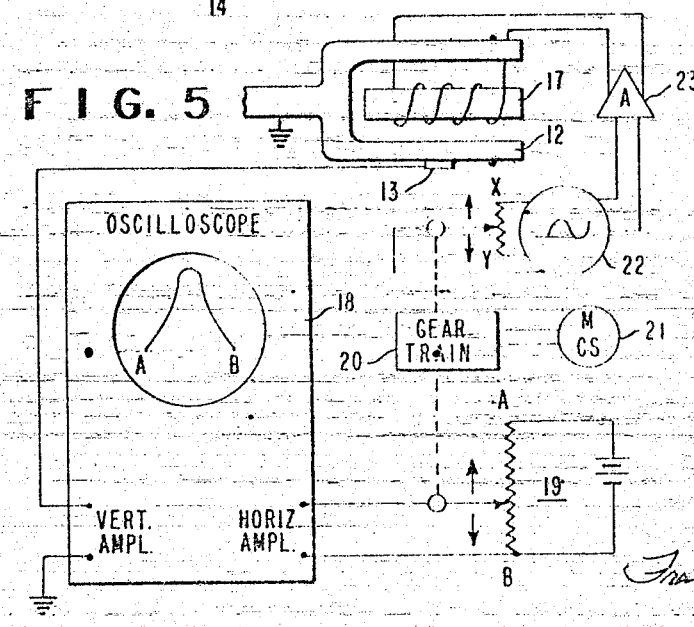
INVENTOR
HENRY J. STINGER
Francis A. Paintin
ATTORNEY > United States Patent Office 3,456,495
Patented July 22, 1969

3,456,495
METHOD AND APPARATUS FOR MEASURING DYNAMIC FRICTIONAL PROPERTIES OF ELASTOMERS
Henry Joseph Stinger, Wayne, Pa., assignor to E. I. du Pont de Nemours and Company, Wilmington, Del., a corporation of Delaware
Filed Jan. 26, 1967, Ser. No. 611,912
Int. Cl. G01n 29/00
U.S. Cl. 73—67.1   6 Claims

ABSTRACT OF THE DISCLOSURE

A vibratory device, suitable for measuring the dynamic frictional properties of a rubber test piece, having a tuning fork with a stylus attached to a tine. The stylus is held in contact with the surface of the test piece. A solenoid is located between the tines to vibrate the fork, thereby moving the stylus laterally against the rubber surface. A piezoelectric crystal is located on a tine to sense the amplitude of vibration and transmit it to an oscilloscope. A variable frequency oscillator-generator varies the frequency of AC current to the solenoid. The oscilloscope depicts the damped resonance curve, the half-power bandwidth of which is a function of dynamic friction of the rubber.

BACKGROUND OF THE INVENTION

Field of the invention

This invention relates to sensing devices and methods employing vibratory members and, more particularly, to the use of such devices and methods to measure the properties of test pieces as a function of their effect on vibration characteristics.

Description of the prior art

In the evaluation of rubbers and elastomeric materials it is often highly desirable to know what the dynamic frictional characteristics of the materials are without the necessity of making a complete fabrication of an article, like a tire, with subsequent actual performance tests. Moreover, it is even more desirable to determine what part of the dynamic friction so measured is due to its adhesive component and what part is due to its hysteretic component.

In U.S. Patents 2,733,596 and 3,030,803 to Painter, devices are described wherein a vibratory device is used to evaluate elastomers by measuring the elastic and damping modulus. Bradfield, U.S. Patent 2,803,129, describes a device which uses vibrations to measure flaws in elastic materials. Kleesattel, U.S. Patent 3,153,338, describes a resonant sensing device which measures surface properties of materials, such as surface compliance and mechanical impedance, as a function of the shift in resonant frequency of a vibratory member caused by a test piece.

None of the prior art teachings provides a means to measure dynamic friction of elastomeric materials.

SUMMARY OF THE INVENTION

It has been found that a vibratory sensing device can be used to determine the dynamic friction of a rubber, which device comprises (1) a vibratory member having a stylus attached thereto, (2) means for holding said stylus in deforming contact with the surface of a test piece, (3) means for inducing vibratory motion of said member over a range of frequencies including the resonant frequency, said motion imparting a lateral vibratory movement of the stylus with respect to the test piece surface, (4) means for sensing the amplitude of vibration of said member over said frequency range, and (5) means for sensing the difference in frequencies at which the vibration amplitude is 0.707 times the maximum amplitude of vibration within said range. The magnitude of that difference is a direct function of the dynamic friction of the rubber.

BRIEF DESCRIPTION OF DRAWINGS

FIG. 1 is a graphic plot of amplitude against frequency for a tuning fork alone, and for a tuning fork having styli pressed against a rubber test piece.

FIG. 2 is an enlarged section showing only a stylus tip pressing a rubber test piece.

FIG. 3 is a partial plan view of an apparatus according to this invention showing the fork and solenoid.

FIG. 4 is a side sectional view of the apparatus of FIG. 3 showing the mounting of the test piece.

FIG. 5 is a schematic representation of the circuit and related parts of the invention.

DESCRIPTION OF PREFERRED EMBODIMENTS

An undamped tuning fork does not exhibit any significant vibration above or below its vibration frequency $f_{(fork)}$.

Thus, a graphic representation of frequency against amplitude of vibration is in the form of a spike plot as shown in FIG. 1 where the only appreciable amplitude of vibration occurs at $f_{(fork)}$. This undamped natural frequency in cycles per second (c.p.s.) corresponding to the fundamental mode of vibration will approximately follow the equation $$f_{(fork)} = \frac{1}{2\pi}\sqrt{\frac{K}{m}}$$

where K is the stiffness and m is the mass.

Where damping is present such as that contributed by the elastomer rubbing against the fork stylus, the resonant frequency will approximately follow the equation $$f_{(test)} = \frac{1}{2\pi}\sqrt{\frac{K}{m} - \frac{D^2}{4m^2}}$$

where the additional term D is the damping coefficient. Under these conditions the amplitude A of the vibrating member is $$A = \frac{F}{-(2\pi f)^2 m + j(2\pi f)D + K}$$

where F is the vibrational force and the other terms are as described above. A plot of A over the test range of frequencies will produce the resonance curve shown in FIG. 1. If the damping force is appreciable, the plot will be bell-shaped. If one marks the frequencies $f_1$ and $f_2$, which occur at 0.707 times the maximum amplitude $A_{(test)}$, the difference between $f_1$ and $f_2$ is $\Delta f$ and this is known as the one-half power bandwidth. It is called this because the amplitudes at 0.707 times the maximum amplitude represent one-half the power in the system at resonance.

When the damping force is created by a stylus 10 attached to a tuning fork tine 12 being pressed against a rubber test piece 11 as shown in FIGS. 2 and 4 and the stylus 10 vibrates laterally as shown, the bandwidth $\Delta f$ will be a measure of the dynamic friction caused by the rubber test piece. It can be shown that the absolute value of the damping term corresponding to dynamic friction is $$D = a(2\pi m)\Delta f$$

where $a$ is a proportionality factor. Since bandwidth will change somewhat with increases in temperature for the same test piece, comparative experiments should be run at the same temperature (e.g., room temperature).

The dynamic friction measured will include both an adhesive component and a hysteretic component. To eliminate the adhesive component and measure the hysteretic only, one can lubricate the stylus point with bentonite clay or preferably by placing a thin low-friction sheet, such as "Teflon" fluoro-polymer, over the rubber test piece at the point where the stylus touches it.

Although this device can be adapted to show the change in maximum amplitude of vibration or the change in frequency at maximum amplitude, in comparison to the fork itself or some other test piece, the measurement of dynamic friction is not a single or simple function of these factors and they need not be measured by this device. It might, however, be desirable to adapt the device to accomplish this so that determinations such as dynamic modulus, etc., can be made in addition to dynamic friction.

Referring now to the drawings, particularly FIGS. 3, 4 and 5, it can be seen that a pair of steel styli 10 are attached to the tines of a tuning fork 12. A fork having a frequency of vibration at 50 cycles per second (c.p.s.) is suitable. Mounted on the side of one of the tines is a piezoelectric crystal 13. A lead titanate crystal attached by means of a conductive epoxy cement can be used. A support platform 14 is attached to the fork 12 and extends out under the tines to hold the rubber test piece 11 as shown. It is desirable that the test piece 11 be held under about 10% compression. This is accomplished by cover piece 15, which has a hole for the styli 10, and is supported by suitably dimensioned blocks 16. The assembly is held into place by conventional clamping means (not shown). The displacement or penetration of the styli 10 into the test piece 11 should be kept constant. A typical test piece 11 is a slab 2 in. by 1 in. by 0.08 in. The styli penetrate and deform (but not puncture) the test piece about 0.018 in. in the 0.08 in. thickness. Each stylus is about 0.05 in. in diameter with a rounded tip contacting the rubber. The measured value of dynamic friction is a function of the area of contact between the tips of the styli and the rubber. For this reason it will increase or decrease as the penetration increases or decreases.

A solenoid 17 is mounted between the tines of fork 12. One end is fixed near the base of the fork, and the other end is spaced from the tines as shown in FIG. 3. When an alternating current is passed through the solenoid 17, the varying flux between the tines will act as a vibration driving force at the particular frequency of current alternation. By employing means to adjust or vary the current frequency, one can apply a variable frequency drive to the fork.

The piezoelectric crystal 13 will generate a charge whose voltage, ranging from about 0.1 to 10 volts, will be proportional to the amplitude of vibration of the fork. The output from this crystal 13 is connected to the vertical amplification terminal of an oscilloscope 18.

The horizontal amplification terminal of the oscilloscope is connected to a variable potentiometer 19. The needle of the potentiometer 19 is connected to a gear train 20, driven by a constant speed clock motor 21. The gear train is arranged so that there will be an alternating sweep from A to B (i.e., a sweep of about 0 to 10 volts) every two minutes.

The gear train 20 simultaneously drives the selector on a variable frequency (50 to 70 c.p.s.) oscillator-generator 22 (e.g., a Hewlett-Packard model 202A).

The output from the generator 22 is passed to an amplifier 23 (e.g., a Bogen PA) which is in turn connected across the terminals of solenoid 17.

The apparatus operates as follows: the tuning fork 12 has a damped resonant frequency of maximum amplitude within the approximate range from 51 to 70 c.p.s. (e.g., 60 c.p.s.) for the particular fork used. When damped by the styli touching the rubber test piece 11, this resonant frequency increases with stiffness and decreases with the dynamic friction or damping as is evident from the foregoing equations. It may increase or decrease with mass depending on the relative values of the stiffness or damping. The gear train 20 varies the frequency of the current supplied by generator 22 to the solenoid 17. This causes the fork 12 to be driven at frequencies within this range. The amplitude of vibration will vary as shown by the bell-shaped plot in FIG. 1. This amplitude will be sensed by the crystal 13 and a proportional voltage will be transmitted to the oscilloscope 18 causing vertical deflection proportional to this voltage. The gear train 20 will synchronously vary the horizontal position of the trace on the scope 18 from A to B. The scope 18 will show visually a bell-shaped curve characteristic of the damping caused by the rubber test piece 11.

The bandwidth $\Delta f$ may then be determined by measurement of the picture on the scope. It is even possible to photograph the scope curve and make the measurements from the photo. A more sophisticated form of the device could include means for sensing the two points on the sweep at which the crystal was signalling an amplitude of 0.707 times the maximum, and start a count to read out bandwidth directly.

The apparatus can be calibrated to give direct readings in terms of absolute dynamic friction. It is most often used, however, as a comparative device to compare the dynamic friction as a function of bandwidth of a test piece with that of a test piece of a rubber composition whose actual frictional performance is known (e.g., styrene-butadiene or natural rubber compositions).

As stated above, when the styli are pressed against the test piece in an unlubricated condition, the bandwidth $\Delta f$ is a measure of adhesive friction plus hysteretic friction. To measure the degree of each, the bandwidth is measured on a test piece first in a dry and next in a lubricated condition; the hysteretic component is thus measured directly in the latter reading, and the adhesive component is determined by difference from the former reading.

Use of the apparatus for dynamic friction measurement also permits determination of other data. For example, when it is found that a certain factor (e.g., amount of particle size of carbon black) has a proportional effect on the dynamic friction of the rubber composition, then measurement of dynamic friction can be a measure of this other factor. If the rubber composition is not homogeneous, the rubber contacting one stylus may differ in composition from the rubber contacting the other stylus. Thus, bell-shaped response curves created by each stylus will differ in shape and/or a resonant frequency. However, since there is but one curve determined and depicted on the oscilloscope, it will be the product of the two and appear as a single bell-shaped curve with a hump one side of the peak. The device is thus capable of determining the non-homogeneity of the compounded rubber stock whenever such a hump appears.

A device which can be used to determine both the adhesive component and hysteretic component of dynamic friction is very valuable. For example, it enables one to find from a very simple test whether a tread stock would exhibit good traction on wet pavement, which is dependent primarily on the hysteretic component alone.

What is claimed is:

1. A vibratory sensing device which comprises:
   (a) a vibratory member having a stylus attached thereto,
   (b) means for holding said stylus in deforming contact with the surface of a test piece,
   (c) means for inducing vibratory motion of said member over a range of frequencies including the resonant frequency, said motion imparting a lateral vibratory movement of the stylus with respect to said test piece surface,
   (d) means for sensing the amplitude of vibration of said member over said frequency range, and
   (e) means for sensing the difference in frequencies at which the vibration amplitude is 0.707 times the maximum amplitude of vibration within said range.

2. A device as defined in claim 1 wherein said vibratory member is a turning fork having said stylus attached to a tine.

3. A device as defined in claim 2 wherein said means for inducing motion is a solenoid located between the tines of said fork.

4. A device for measuring the dynamic friction of a rubber test piece which comprises:
   (a) tuning fork means having a stylus attached to a tine thereof,
   (b) means for holding said stylus in deforming contact with the surface of said test piece,
   (c) an alternating current solenoid located between the tines of said fork to induce vibratory motion of said tines over a range of alternating current frequencies including the resonant frequency, said motion imparting a lateral vibratory movement of the stylus with respect to the test piece surface,
   (d) a piezoelectric crystal attached to a tine of said fork to produce an output voltage proportional to the amplitude of vibration of said fork,
   (e) an alternating current generator means to supply current to said solenoid over said frequency range,
   (f) means to continuously vary the frequency of the alternating current supplied by said generator,
   (g) means to continuously sense the amplitude of vibration of said fork at the frequency causing said vibration and thereby sense the difference in frequencies at which the vibration amplitude is 0.707 times the maximum amplitude of vibration within said range.

5. A method of determining the dynamic friction of a rubber test piece which comprises pressing a stylus into deforming contact with the surface of said test piece, vibrating an elongated mechanical member connected to said stylus over a range of frequencies, including the resonant frequency, in a direction that causes lateral vibration of the stylus with respect to said test piece surface, sensing the amplitude of vibration of said member over said frequency range, and measuring the difference in frequencies at which the vibration amplitude is 0.707 times the maximum amplitude of vibration within said range.

6. The method defined in claim 5 wherein the hysteretic component of friction is measured apart from the adhesive component by lubricating said test piece at its point of contact with said stylus.

References Cited
UNITED STATES PATENTS

| | | | |
|---|---|---|---|
| 2,695,517 | 11/1954 | Wiggins | 73—67.1 |
| 2,733,596 | 2/1956 | Painter | 73—67.1 |
| 2,973,639 | 3/1961 | Banks | 73—67.1 XR |
| 3,030,803 | 4/1962 | Painter | 73—67.1 |
| 3,153,338 | 10/1964 | Kleesattel | 73—67.1 |

RICHARD C. QUEISSER, Primary Examiner

JOHN P. BEAUCHAMP, Assistant Examiner